G. H. LUND.

Improvement in Cultivators.

No. 131,404.    Patented Sep. 17, 1872.

Witnesses.    Inventor.
E. M. Beach    George Henry Lund
James Cushing

UNITED STATES PATENT OFFICE.

GEORGE HENRY LUND, OF MACKFORD, WISCONSIN.

IMPROVEMENT IN CULTIVATORS.

Specification forming part of Letters Patent No. 131,404, dated September 17, 1872.

*To all whom it may concern:*

Be it known that I, GEORGE HENRY LUND, of Mackford, in the county of Green Lake and State of Wisconsin, have invented certain new and useful Improvements in Wheel-Cultivators, which are simple in construction, light, and convenient in operation, and durable in use; and consist in an improved device for regulating the depth of the cultivator-teeth; the means by which the drag-bars are held in sections—or each bar may be left to have a free independent vertical movement, if desired; and in the construction and arrangement of parts, as hereinafter more fully described and pointed out by the claims; and I do hereby declare that the following is a full, clear, and exact description, which will enable others skilled in the art to which it appertains to make and use the same, reference being had to the accompanying drawing, with letters of reference marked thereon, forming a part of this specification, in which—

Figure 1:
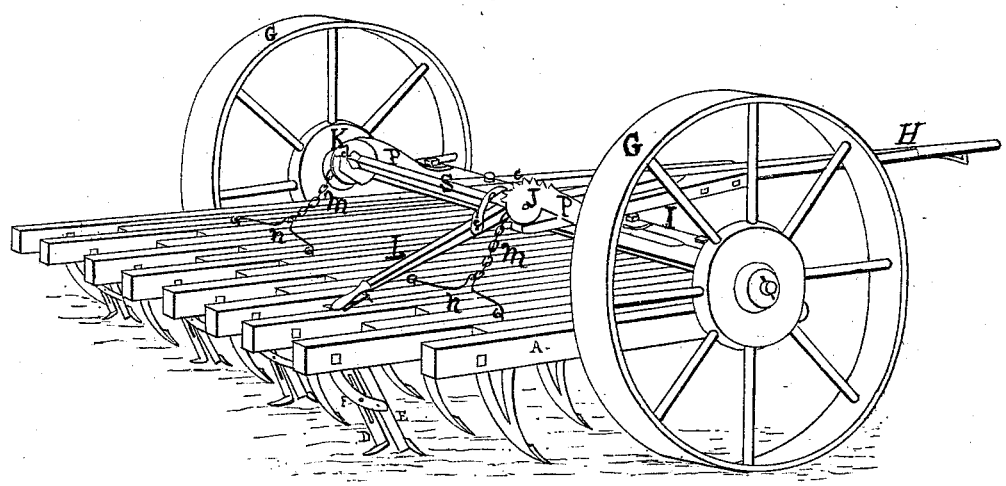
Figure 2:
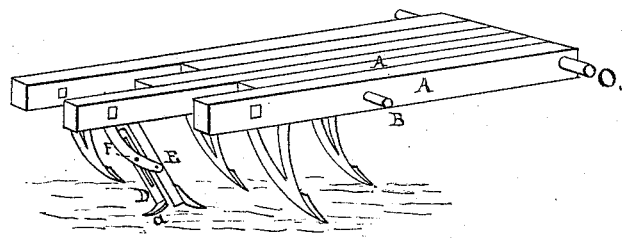

Figure 1 is a perspective view of a device embodying my invention; and Fig. 2 is a view of a portion of the drag-bars and cultivator standards and gages detached from the frame.

G G represent suitable wheels having broad bearing-surfaces, so that the wheels will not "sink in" when going over soft or newly plowed ground. The said wheels are connected in the usual manner by the axle I. The drag-bars A are hinged or pivoted beneath the axle 1 by having perforations in the forward ends, through which passes the rod or shaft O, which is conveniently attached to and beneath the axle. The beams A have each a perforation near the center corresponding to each other, so that by inserting a pin or bolt, B, of the required length any two or more of said beams may be pivoted together in sections, each section having as many drag-bars as desired; or the pin or bolt B may be removed, leaving the drag-bars separate, so that each bar will have a free independent vertical movement. The drag-bars are of different lengths, so that the teeth may stand in two or more ranks, as desired. The object of fastening the drag-bars together in sections having more or less drag-bars in each section is, that enough of bars may be coupled together in each section, so as to render each section of sufficient weight to thoroughly and smoothly cultivate or pulverize the ground. E represents the standards, having shovels or plows of any desired form attached thereto. The curved brace F is pivoted to the standard extending upward and rearward to the rear end of the drag-bar, and secured thereto. D represents the gage, which is formed having a long slotted arm and a downward and rearward-extending foot, *a*. By means of the slot and a bolt the gage is secured to the brace F, so that the gage may be adjusted to allow the plow or shovel to run to a sufficient depth, and the gage may also be adjusted nearer to or further from the plow, which adjustment is often necessary in hard stony ground. H represents a tongue of any suitable construction. P P represent two arms extending upward and rearward from the axle supporting the rock-shaft S, to which is attached eccentric wheel K, having pulley-catch *d* for the purpose of holding the shaft in position (when the drag-bars are elevated) through the medium of the lever L, catch *e*, and serrated head *c* of the arm-head J. M and N represent links and chains by which the drag-bars are connected to the wheels attached to the rock-shaft, for the purpose of raising the drag-bars in going to and from the field.

Having thus fully described my invention, what I claim, and desire to secure by Letters Patent, is—

1. The drag-bars A, each being independently pivoted at the forward end, and provided with perforations near the center, so that said bars may be used in sections having more or less bars in each section, by means of the pin or bolt B, substantially as and for the purpose specified.

2. The combination of the beam A, standard E, brace F, and gage D, the several parts being constructed as described, and arranged so that the gage may be adjusted high or low, and to or from the shovel or plow, substantially as and for the purpose set forth.

3. The bars A, chains and links M N, in combination with parts K *d* S J *c e*, and lever L, all constructed and arranged substantially as and for the purpose herein described.

GEORGE HENRY LUND.

Witnesses:
E. M. BEACH,
JAMES CUSHING.